Jan. 8, 1924. 1,480,194
R. B. BIXLER ET AL
HYDRAULIC BRAKE
Filed Oct. 23, 1922 2 Sheets-Sheet 1

INVENTORS
R. B. Bixler
W. E. Steadman
BY
ATTORNEY.

Jan. 8, 1924.

R. B. BIXLER ET AL

HYDRAULIC BRAKE

Filed Oct. 23, 1922

1,480,194

2 Sheets-Sheet 1

INVENTORS
R.B. Bixler
W.E. Steadman
BY
ATTORNEY.

Jan. 8, 1924. 1,480,194
R. B. BIXLER ET AL
HYDRAULIC BRAKE
Filed Oct. 23, 1922 2 Sheets-Sheet 2

INVENTORS
R.B. Bixler
W.E. Steadman.
BY
ATTORNEY.

Patented Jan. 8, 1924.

1,480,194

UNITED STATES PATENT OFFICE.

RALPH B. BIXLER AND WILLIAM E. STEADMAN, OF DENVER, COLORADO.

HYDRAULIC BRAKE.

Application filed October 23, 1922. Serial No. 596,288.

*To all whom it may concern:*

Be it known that we, RALPH B. BIXLER and WILLIAM E. STEADMAN, citizens of the United States, residing at Denver, in the county of Denver and State of Colorado, have invented certain new and useful Improvements in Hydraulic Brakes, of which the following is a specification.

Our invention relates to an hydraulic brake and its object is to provide a mechanism of simple construction which by restriction of the displacement of a hydraulic fluid, acts upon a rotating body to retard or arrest the movement thereof.

Our invention is of particular value for use in connection with motor-driven vehicles since it provides an efficient and easily controlled medium to quickly stop a vehicle or retard its movement to any desired speed, without detrimental stress upon the parts of the operating mechanism upon which the movement-restraining influence is exerted.

An embodiment of our invention has been illustrated in the accompanying drawings in which like characters of reference designate corresponding parts throughout the several views and in which—

Figure 2:
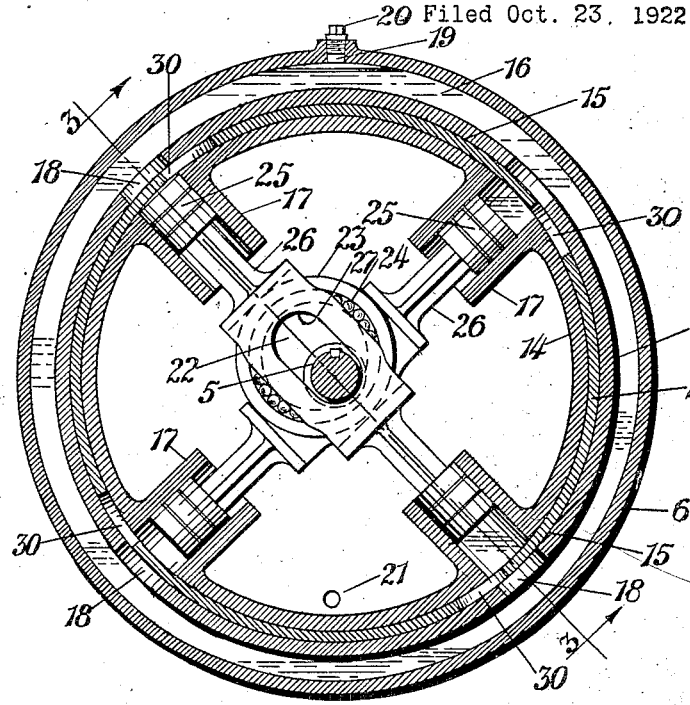
Figure 3:
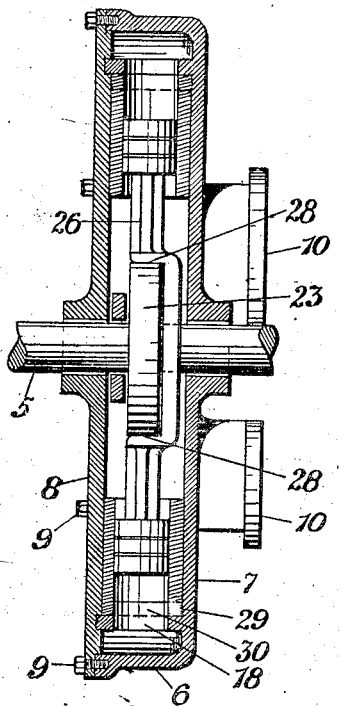
Figure 1:
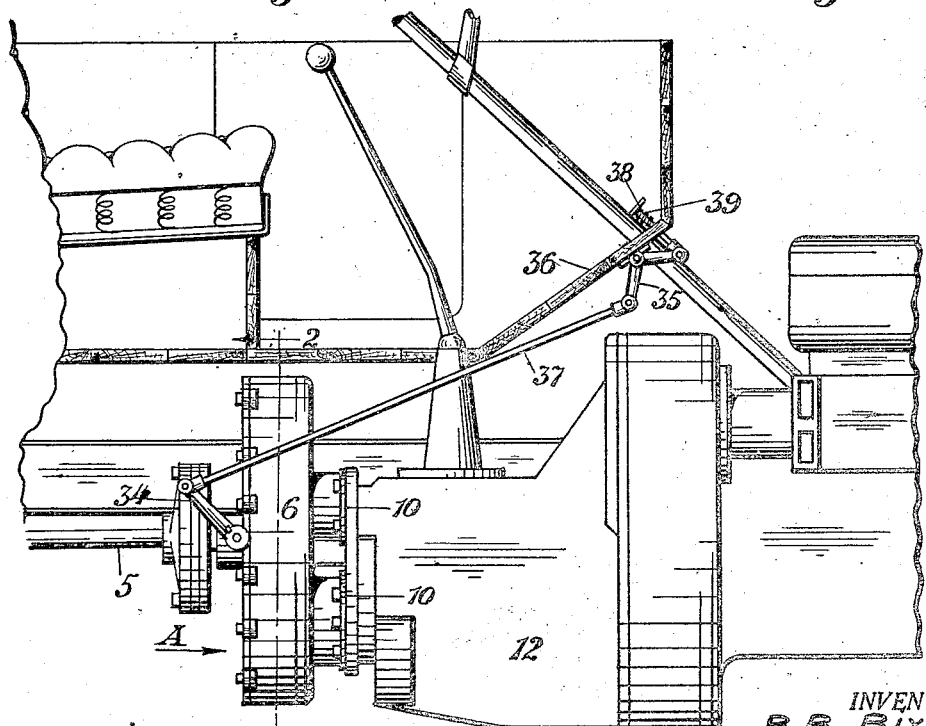
Figure 2:
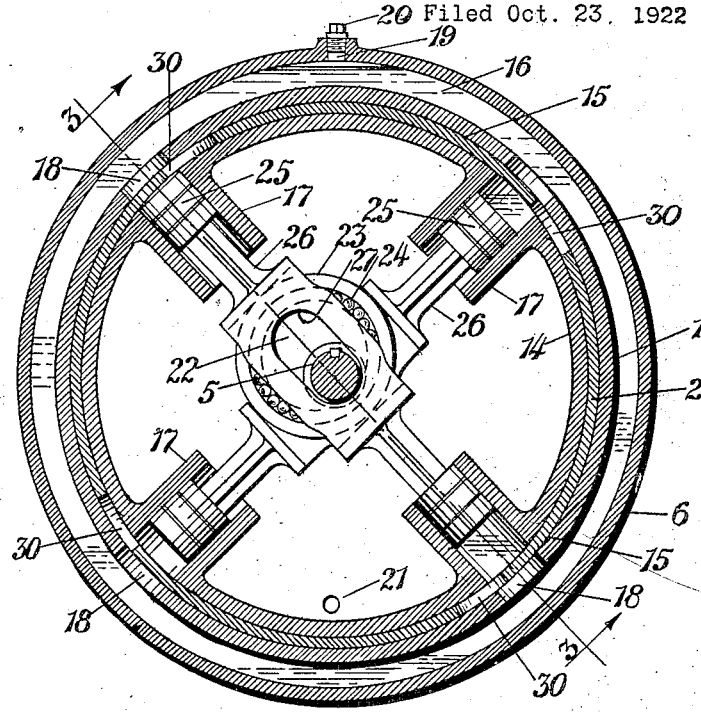
Figure 3:
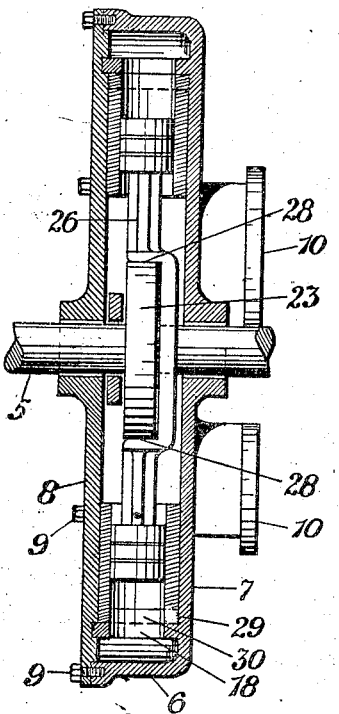
Figure 1:
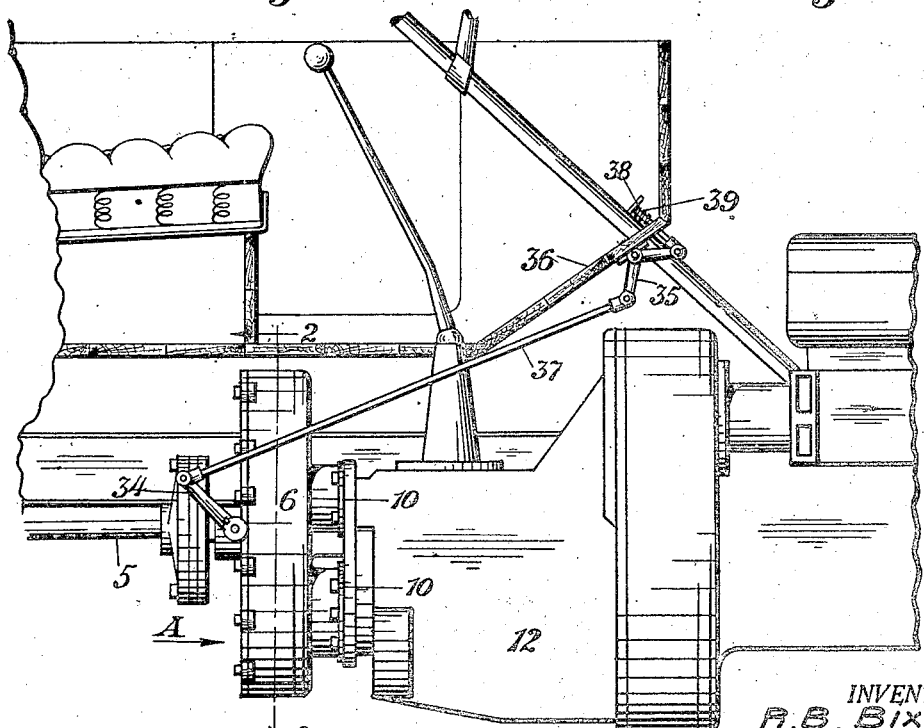
Figures 4, 5:
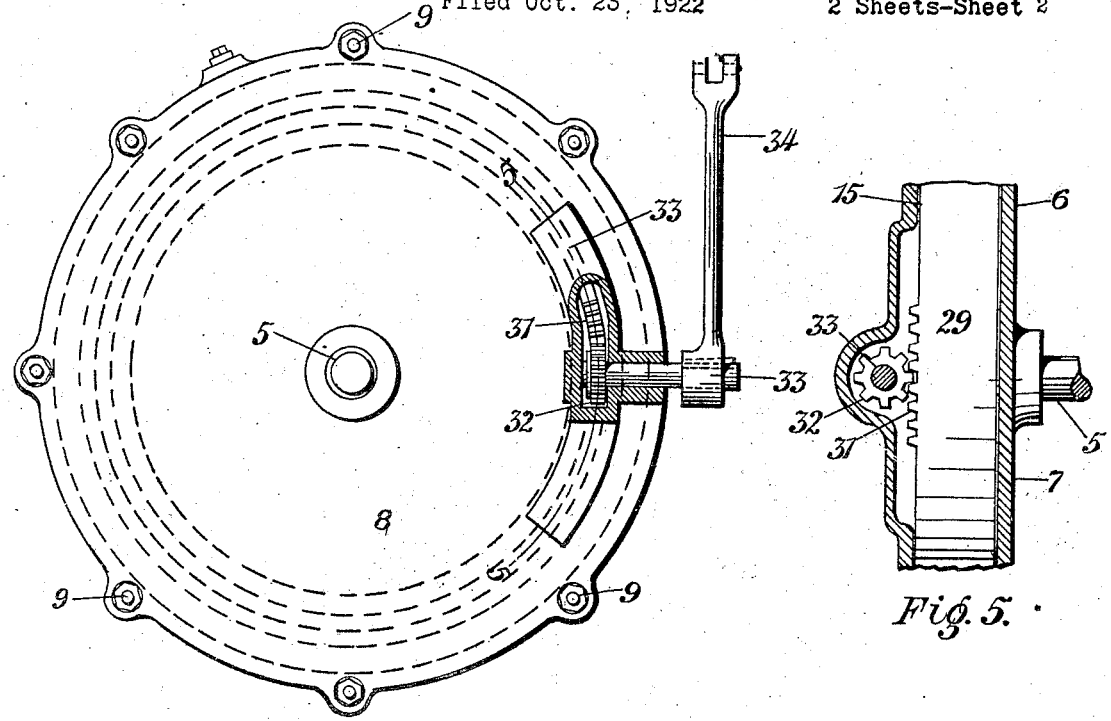

Figure 1 represents a fragmentary sectional elevation of the body and chassis of a motor driven vehicle showing the application of our hydraulic brake to the driving shaft thereof;

Figure 2, an enlarged sectional elevation of the brake taken on the line 2—2, Figure 1;

Figure 3, a section taken on the line 3—3, Figure 2;

Figure 4, an enlarged, partially sectional face view of the brake-housing looking in the direction of the arrow A in Figure 1;

Figure 5, a fragmentary section taken on the line 5—5, Figure 4; and

Figure 6:
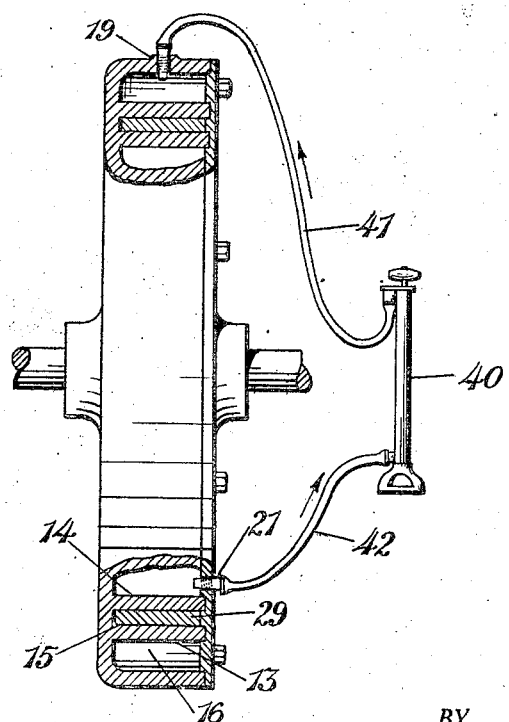

Figure 6, a sectional elevation of the brake showing the application thereto of means for transferring liquid which had leaked past the pistons included in the operating mechanism of the brake, to the reservoir of the same.

Referring more specifically to the drawings, the reference character 5 designates the driving shaft of a motor driven vehicle to which our improved hydraulic brake is applied.

The brake comprises a cylindrical housing 6 composed of a body member 7 and a cover member 8 which are bolted together by means of cap-screws 9. The housing is provided with flanges 10 for its rigid connection with the engine frame 12 or other stationary part of the vehicle and its lid and body-member have central, axially alined holes for the passage of the shaft to which the brake mechanism is applied.

The body-portion of the housing has interiorly in integral connection with its end-wall, two concentric circular partitions, 13 and 14, which are spaced apart to provide an annular valve-chamber 15 and the outer one of which is spaced from the cylindrical wall of the casing to form a reservoir 16 in which, in practice, the hydraulic liquid is contained.

The edges of the partitions are preferably fitted in circular grooves of the lid of the housing in order to produce a fluid-tight connection therewith.

The inner partition 14 has two pairs of opposed, preferably axially alined and radially, inwardly projecting open-ended piston chambers 17, and the outer partition has ports 18 of corresponding diameter in alinement with said chambers.

The brake housing has an opening 19 at the top of its peripheral wall which is normally closed by a screw-plug 20 and which in practice is used to fill the reservoir of the brake with an oil or other suitable liquid, indicated in broken shading in Figure 2 of the drawing, and it has in its end wall an opening 21 which serves to draw from the space inside the inner partition 14 any liquid that may have leaked past the pistons which are fitted in the cylinders, as will hereinafter be more fully described.

The shaft 5 carries inside the housing of the brake, an eccentric disk 22 which in order to reduce friction and resultant wear, is provided with a loose ring 23 supported upon a ball-bearing 24.

The before mentioned pistons 25 which are fitted for reciprocation in the piston chambers through the medium of rings or other suitable packing-media, are coupled in pairs by means of yokes 26 to which they are rigidly attached.

The yokes have longitudinal slots 27 through which the drive shaft passes and they are offset at opposite ends of their slotted portions to provide opposed shoulders 28 which bear upon the ring of the eccentric.

Rotatably fitted in the annular valve-chamber 15 is a correspondingly shaped valve 29 which has openings 30 adapted to register with the open ends of the piston chambers and the therewith alined ports in the outer partition of the brake housing.

The valve has at its edge facing the lid of the housing, a series of gear teeth 31 which are engaged by a pinion 32 disposed in a recess formed by a swell 33 of the lid, which likewise provides the space required for the movement of the toothed portion of the valve.

The pinion is mounted on a short shaft 33 which extends through a bearing on the lid, and which at its outer end carries a crank-arm 34 for its operative connection with the controlling element of the brake.

This element which may be of any suitable character, consists in the construction shown in Figure 1 of the drawings, of a bell crank 35 fulcrumed on the foot-board 36 of the vehicle, a rod 37 which connects an arm of the crank with the arm of the pinion-shaft, a pedal 38 extending through an opening of the foot-board and connected to the other arm of the bell crank, and a spring 39 which holds the parts in their normal position in which the openings of the valve are in full register with the ends of the piston chambers and the ports of the reservoir to permit of the unrestricted passage of liquid from one to another.

In operation, the reservoir 16 and the therewith communicating outer portions of the piston chambers are filled with a liquid, preferably oil, and under normal running conditions, the valve is placed in the position in which its openings completely register with the ends of the cylinders and the therewith alined ports 18 of the reservoir.

When it is desired to retard or arrest the movement of the shaft on which the eccentric is mounted, the operator turns the valve by depression of the pedal and thereby reduces the size of the orifices through which the liquid displaced by the reciprocating movement of the pistons enters and leaves the respective piston chambers.

Owing to the restricted passage of the fluid from the piston chambers, the displacement of the bodies in the chambers of the outwardly moving pistons, is retarded and said bodies present in consequence, a resistance to the movement of the pistons which re-acts upon the eccentric and the shaft upon which the latter is mounted.

It will thus be evident that by proper regulation of the valve, the movement of the shaft to which the brake is applied, may be retarded or arrested at the will of the operator.

It will be observed that by disposing the piston chambers at quadrant points of the stationary housing, the eccentric and therewith associated piston-units are readily arranged so that when the eccentric rotates with the shaft on which it is mounted, one piston unit will move in advance of the other and the restraining influence of the bodies of liquid retained in the cylinders by the restriction of their outlets through adjustment of the valve, will be gradually exerted upon different points in the circumference of the eccentric and, as long as the valve remains in its adjusted position, in a continuous succession of alternating impulses.

Three or more piston-units may in a similar manner, be arranged in a correspondingly increased number of piston chambers to still further distribute the restraining forces over the peripheral extent of the eccentric, or a series of single pistons may be arranged to be moved in successive order by rotation of the drive shaft and produce a similar though perhaps less efficient result.

In the event of liquid leaking past the pistons into the space of the housing within the inner partition 14, it may be returned to the reservoir 16 by any suitable means, such as, for example, a suction pump 40 which, as shown in Figure 6, of the drawings, is connected with the apertures 19 and 21 of the housing by means of conduits 41 and 42.

Having thus described our invention, what we claim and desire to secure by Letters Patent is:

1. A hydraulic brake comprising in combination with a rotary element, a relatively stationary housing having a reservoir and a plurality of pairs of opposed piston-chambers communicating therewith, a liquid body in the reservoir, a plurality of independent piston-units each having two connected pistons fitted for reciprocation in the chambers of one of the pairs, an eccentric on the rotary element acting upon the piston-units for their synchronous operation, and an adjustable valve controlling the passage of the liquid between the reservoir and the piston chambers.

2. A hydraulic brake comprising in combination with a rotary element, a relatively stationary housing having a reservoir and a plurality of pairs of opposed piston-chambers communicating therewith, a liquid body in the reservoir, a plurality of independent piston-units each having two connected pistons fitted for reciprocation in the chambers of one of the pairs, an eccentric on the rotary element acting upon the piston-units for their synchronous operation, the eccentric and the piston-units being relatively arranged for the movement of the pistons of one unit in advance of those of another in their respective chambers, and an adjustable valve controlling the passage of the liquid to and from the piston chambers.

3. A hydraulic brake comprising in combination with a rotary element, a relatively stationary cylindrical housing having axially radial, open-ended piston chambers, a reservoir, and an annular valve-chamber having ports communicating with the reservoir and alined with the respective piston-chambers, a circular valve in the valve-chamber, having openings adapted to register with said ports, a body of liquid in the reservoir, reciprocating pistons in the piston chambers, means for operating the pistons by movement of the rotary element, and means for the rotary adjustment of the valve.

4. A hydraulic brake comprising in combination with a rotary element, a relatively stationary cylindrical housing having axially radial, open-ended piston chambers, a reservoir, and an annular valve-chamber having ports communicating with the reservoir and alined with the respective piston-chambers, a toothed circular valve in the valve-chamber, having openings adapted to register with said ports, a body of liquid in the reservoir, reciprocating pistons in the piston chambers, means for operating the pistons by movement of the rotary element, a pinion meshing with the teeth of the valve, and means outside the housing for the adjustment of the valve by rotation of the pinion.

5. A hydraulic brake comprising in combination with a rotary element, a relatively stationary, cylindrical housing having open-ended radial piston chambers, a ported partition in the space surrounding the piston chambers, dividing said space into an annular valve chamber and a reservoir, a circular valve in the valve chamber, having openings adapted to register with the ports of the partition, means for the rotary adjustment of the valve, a body of liquid in the reservoir, reciprocating pistons in the piston chambers, and means for the operation of the pistons by movement of the rotary element.

6. A hydraulic brake comprising in combination with a rotary element, a relatively stationary housing having four piston chambers at quadrant points of a circle, a reservoir in communication with said chambers, a body of liquid in the reservoir, an adjustable valve controlling the passage of liquid to and from the piston chambers, two piston-units each having two connected pistons fitted for reciprocation in two opposed piston chambers, and an eccentric on the rotary element for the synchronous operation of said piston-units.

7. A hydraulic brake comprising in combination with a rotary element, a relatively stationary housing having a reservoir and open-ended piston chambers communicating therewith at one of their ends, a body of liquid in the reservoir, an adjustable valve controlling the passage of liquid to and from the piston-chambers, reciprocating pistons in the piston-chambers, means for the synchronous operation of the pistons by movement of the rotary element, and means for transferring liquid that has leaked past the pistons through the other ends of the piston-chambers, to the reservoir.

8. A hydraulic brake comprising in combination with a rotary element, a relatively stationary cylindrical housing, a concentric partition therein, open-ended piston-chambers extending radially inwardly from said partition, a second concentric partition dividing the space around the first mentioned partition into an annular valve chamber and a surrounding reservoir, said second partition having ports in alinement with the piston-chambers, a circular valve in the valve-chamber having openings adapted to register with said ports, means for the rotary adjustment of the valve, a body of liquid in the reservoir, reciprocating pistons in the piston-chambers, and means for the synchronous operation of the pistons by movement of the rotary element.

9. A hydraulic brake comprising in combination with a rotary element, a relatively stationary cylindrical housing, a concentric partition therein, open-ended piston-chambers extending radially inwardly from said partition, a second concentric partition dividing the space around the first mentioned partition into an annular valve chamber and a surrounding reservoir, said second partition having ports in alinement with the piston-chambers, a circular valve in the valve-chamber having openings adapted to register with said ports, means for the rotary adjustment of the valve, a body of liquid in the reservoir, reciprocating pistons in the piston-chambers, means for the synchronous operation of the pistons by movement of the rotary element, and means for draining the space within the inner partition and transferring the drained liquid to the reservoir.

10. A hydraulic brake comprising in combination with a rotary engine-shaft and an element driven by movement of said shaft, a hydraulic brake adapted to oppose the movement of said element by a restricting action upon the shaft and comprising a reservoir, a body of liquid in the reservoir, means for the displacement of the liquid by movement of the shaft, and adjustable means to restrict said displacement and thereby produce a corresponding resistance to the movement of the shaft.

11. A hydraulic brake comprising in combination with a rotary engine-shaft and an element driven by movement of said shaft, a hydraulic brake adapted to oppose the movement of said element by a restricting action upon the shaft and comprising a stationary reservoir, a liquid body in the reservoir, a plurality of piston chambers communicating with the reservoir, reciprocating pistons in the chambers, means for operating the pistons by movement of the shaft, and an adjustable valve controlling the passage of fluid between the reservoir and the piston chambers.

12. A hydraulic brake comprising in combination with a rotary element, a relatively stationary reservoir, a liquid body in the reservoir, a plurality of piston chambers each having a connection with the reservoir, reciprocating pistons in the chambers, means for operating the pistons by movement of the rotary element, and an adjustable valve adapted to vary the flow-capacity of the connections of the several piston chambers with the reservoir, simultaneously.

In testimony whereof we have affixed our signatures.

RALPH B. BIXLER.
WILLIAM E. STEADMAN.